March 30, 1965     G. KESSLER     3,175,257

WATER-RETARDING PILE WEATHER STRIP

Filed Feb. 5, 1963

INVENTOR

Gerald Kessler

BY *Max L. Libman*

ATTORNEY 3,175,257
WATER-RETARDING PILE WEATHER STRIP
Gerald Kessler, 7240 Glenwood Ave., Youngstown, Ohio
Filed Feb. 5, 1963, Ser. No. 256,342
2 Claims. (Cl. 20—69)

This invention relates to weather stripping of the type used chiefly with slider windows and sliding doors such as patio doors.

As is well known, for many applications in connection with modern aluminum window frames and doors, homogeneous vinyl weather stripping is largely employed; however, for sliding doors and windows, and especially where the weight of the door or window rests upon the weather stripping, flexible vinyl weather stripping has a serious drawback due to its high coefficient of friction and its tendency to stick to the metal and metal coating against which it presses. For this reason, pile weather stripping is largely used in these cases, since it allows the sash to slide quite easily. However, the commonly employed types of pile weather stripping are inferior to the vinyl weather stripping in air infiltration and are very much inferior to the vinyl with respect to water infiltration.

It is a major object of the present invention to provide a pile-type weather stripping which has the low friction coefficient of ordinary pile weather stripping, together with the impermeability to both air and water of solid vinyl weather stripping. A further object is to provide an improved method of making such a weather stripping.

In accordance with the present invention, ordinary pile weather stripping, or any similar material such as flock weather strip may be used as a base; to this material is added a plastic foam which is applied to the base of the pile from the roots out to a point slightly below the pile level, so that the body of the weather stripping, particularly in the center portion thereof, is essentially a combined mass of plastic foam and pile fibers, with short pile ends protruding beyond the plastic foam to provide a durable, low-friction engagement surface with the metal against which the window or door rests. The body of foam and fiber is highly impervious both to water and air, and provides a very high quality insulation superior to both solid vinyl weather stripping and to pile weather stripping.

The specific nature of the invention, as well as other objects and advantages thereof, will clearly appear from a description of a preferred embodiment as shown in the accompanying drawing, in which.

Figure 1:
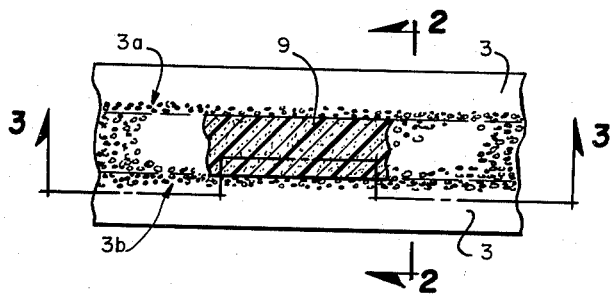
FIG. 1 is a top plan view of a piece of weather stripping according to the invention.
Figure 2:
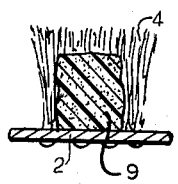
FIG. 2 is a sectional view taken along line 2—2 of FIG. 1.
Figure 3:
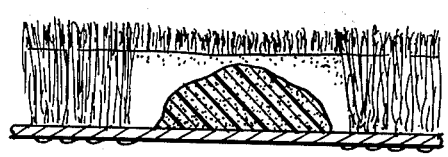
FIG. 3 is a sectional view taken along line 3—3 of FIG. 1.

As shown in FIGS. 1–3, the weather stripping may be based upon an ordinary pile weather stripping comprising a fabric-type backing 2, having bare edges 3 for retention in a suitable groove of a window or a door frame, and supporting at its central portion a number of rows of pile tufts 4 to provide a dense tufted pile surface. This type of pile weather stripping is well known per se, and is widely used both for automobile windows and for sliding doors. Alternatively, the pile may be flock pile of commercial type, with as high a pile as possible, since the foam plastic tends to bind it in place.

Figure 5:
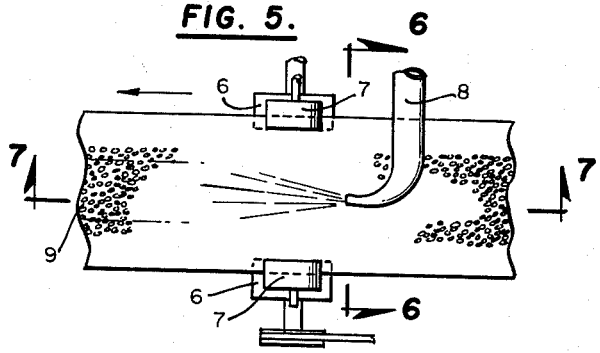
FIG. 5 is a top plan view showing a method of applying the plastic foam.
Figure 6:
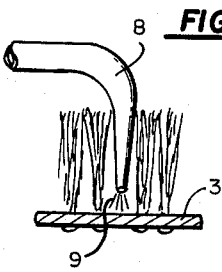
FIG. 6 is a view taken on line 6—6 of FIG. 5.
Figure 7:
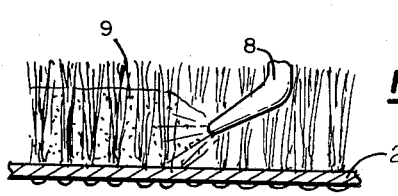
FIG. 7 is a view taken on line 7—7 of FIG. 5.

A strip of pile tape of the above-described type is moved in the direction of the arrow in FIG. 5 by means of rollers 7 which press the edges 3 of the tape between them and are suitably power driven to move the tape at a desired rate of speed. A nozzle 8 which is tapered to a suitably fine point is located above the central line of the moving tape with its pointed aperture as close to the surface of the tape as possible. This nozzle is continuously supplied with freshly prepared foaming plastic in such condition that it will expand to a limited degree immediately upon leaving the nozzle. This can be done by mixing the two major ingredients of the foaming plastic immediately before supplying them to the nozzle, or as they are supplied to the nozzle, as is now well known in the art.

The plastic foam may be polyurethane or vinyl sponge prepared in any conventional manner to provide a mass of material which will expand, due to small entrained gas bubbles, as soon as it leaves the nozzle 8. This is typically achieved by mixing a suitable foaming agent with the vinyl or other plastic compound and using a die orifice (at nozzle 8) sufficiently small so that the resulting expansion after leaving the orifice produces a spongy mass of the desired cross-section.

By applying the foaming material to the central line of the pile material, the rate of application can be readily controlled so that the outermost two rows of pile, 3a and 3b in FIG. 1, serve to definitely control the lateral spread of the foaming material so that it is entirely confined within the pile, while the rate of application is such that the height is controlled so that it extends nearly but not to the top of the pile, leaving the exposed pile edges available as a low friction bearing surface for the window or sliding door. Alternatively, the foam may be allowed to impregnate all of the fibers. The mass of foamed plastic 9 in the center of the pile expands through and around the tufts of pile and fills the spaces that are between the tufts at the roots, thereby providing an impervious mass of sponge-like material having very fine bubbles which serve as excellent insulation, and since the entire mass is soft and resilient, it readily conforms to the available space between the movable and stationary surfaces which it separates, while at all times presenting the pile ends at the point of contact in order to provide a low friction surface. If the material is used for a number of years, it may happen that the foam will deteriorate somewhat at its surface, but this will do no harm since there is also a certain amount of wear on the pile ends, and since deterioration of the foam will tend to continually leave some pile ends exposed, which is desirable. Since the foam expands around the individual tufts and in contact with the bottom layer of tape, it tends to bond all of these elements firmly in place with both chemical and mechanical adhesion, thus further improving the strength and ruggedness of the weather strip. It should be noted that even if the foam should deteriorate completely with time, the resultant pile weather strip would still be as good as the original material before the foam was applied, and the pile would still be as effective as normal untreated pile weather stripping.

Figure 4:
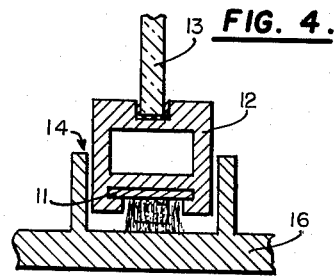
FIG. 4 is a transverse sectional view taken through a sliding sash provided with weather stripping according to the invention.

FIG. 4 shows a typical situation in which the pile is used, wherein it is inserted into a slot 11 of window frame 12 which supports the glass pane 13. The entire window assembly slides in a suitable channel 14 in the stationary part of the structure. In some situations it is preferred to have the pile set into a slot in the stationary frame 16, and it will be apparent that the weather stripping can be used in any fashion in which such weather stripping is normally employed.

I claim:

1. A weather strip comprising a narrow tape member, a pile of flexible fibers extending upward from and retained by said tape member, and a mass of resilient plastic foam extending between said fibers in adherent contact with the fibers and with the tape member, with the ends of said fibers extending a short distance beyond said mass of plastic foam, and the major portion of the length of the fibers adherently imbedded in the plastic foam, said mass of plastic foam being sufficiently thick to serve as the major sealing element of the weather strip.

2. The invention according to claim 1, the lateral edges of said tape extending beyond said fibers to provide a clear strip of tape at each edge along the length thereof.

References Cited by the Examiner

UNITED STATES PATENTS 2,165,594  7/39  Waterhouse.
2,190,206  2/40  Churchill.
2,523,839  9/50  McKinney _____ 20—69 X

FOREIGN PATENTS 779,187  7/57  Great Britain.

HARRISON R. MOSELEY, *Primary Examiner.*